United States Patent [19]

Simon

[11] Patent Number: 5,359,143
[45] Date of Patent: Oct. 25, 1994

[54] PLASTIC CABLEWAY ASSEMBLY

[75] Inventor: Bernard Simon, Caluire, France

[73] Assignee: Mavil, Liernais, France

[21] Appl. No.: 1,619

[22] Filed: Jan. 8, 1993

[30] Foreign Application Priority Data

Jan. 14, 1992 [FR] France .................. 92 00515

[51] Int. Cl.$^5$ .............................................. H02G 3/06
[52] U.S. Cl. .................. 174/101; 174/68.1;
    174/68.3; 174/72 R; 174/97; 174/157
[58] Field of Search ............ 174/101, 95, 97, 68.1,
    174/68.3, 72 R; 138/156, 157, 162, 163

[56] References Cited

U.S. PATENT DOCUMENTS

| | | | |
|---|---|---|---|
| 2,090,239 | 8/1937 | Strang | 174/101 X |
| 2,982,570 | 5/1961 | Lohman | 138/89 X |
| 3,281,005 | 10/1966 | Schumacher | 174/48 X |
| 3,428,799 | 2/1969 | Bassani | 174/41 X |
| 4,589,449 | 5/1986 | Bramwell | 174/101 X |

*Primary Examiner*—Leo P. Picard
*Assistant Examiner*—Hyung S. Sough
*Attorney, Agent, or Firm*—Dowell & Dowell

[57] ABSTRACT

At least two portions of a cableway are joined in end to end relationship by engaging first and second fish plates along the inner surfaces at the joint of the cableway portions. The fish plates abut corresponding arms of each cableway portion and are retained by engagement with a step formed in a web which extends between the arms of each cableway portion and with a rib which depends from a flange associated with each portion of the cableway. A cover and stirrup clips to lock the cover to the cableway portions are also disclosed.

10 Claims, 5 Drawing Sheets

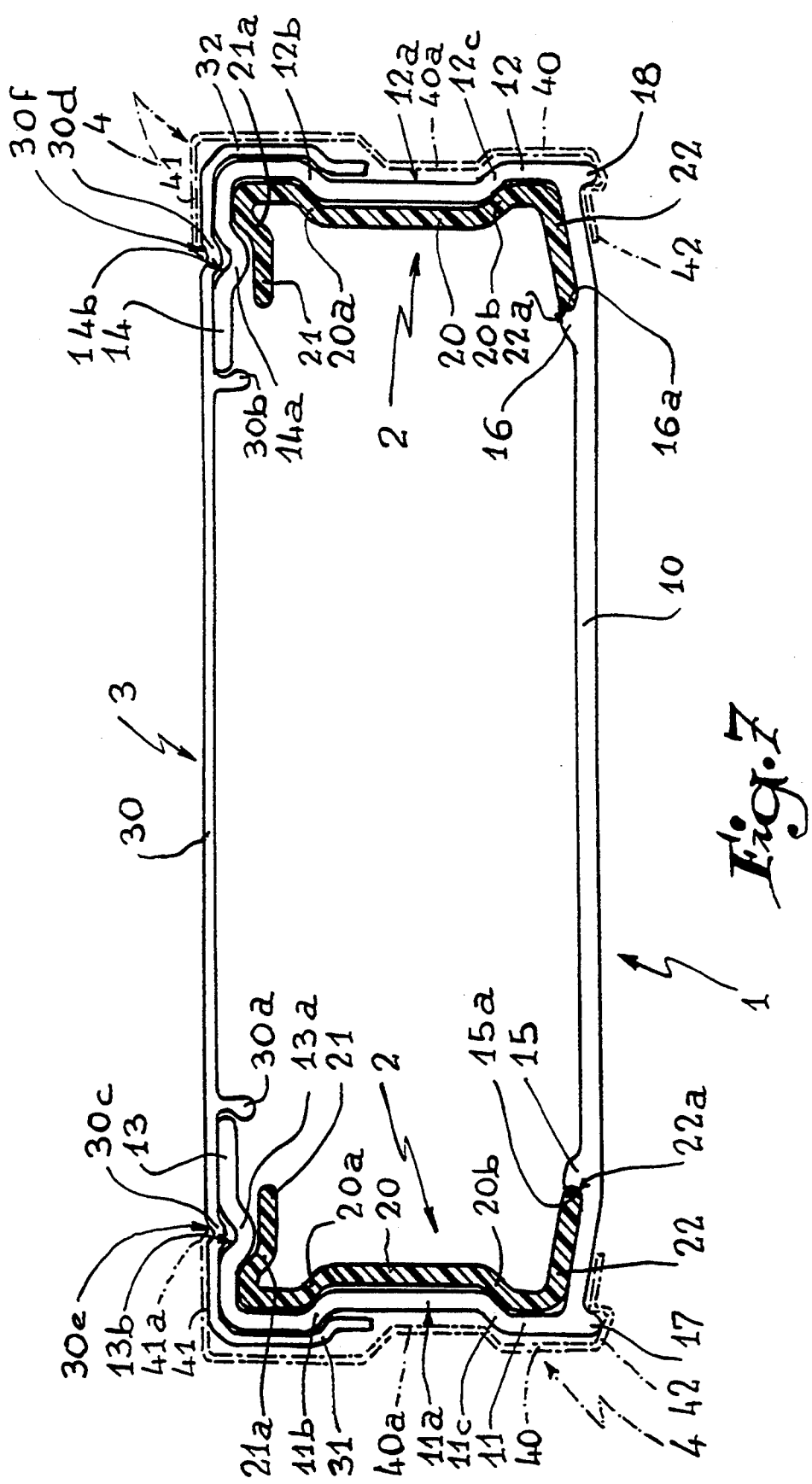

PLASTIC CABLEWAY ASSEMBLY

BACKGROUND OF THE INVENTION

1. Field of the Invention

The present invention relates to a combination of successive portions of cableway made of plastic material and of means for assembling such portions, and to a process for employing this combination.

2. History of the Related Art

In order to support electrical cables or other piping with respect to walls or ceilings, cableways are used composed of successive portions connected by assembly means. The portions in question may be made of plastic material of profiles having a U-shaped cross section of which the free edges comprise a flange parallel to the bottom and oriented inwardly. Time successive portions are generally connected by bolted fish plates, which necessitates holes in the portions. In fact, as the portions are made by extrusion, it is not possible to provide holes in their walls at the moment of manufacture.

It will be readily understood that the operations of securing the successive portions end to end are thus long and expensive.

The improvements forming the subject matter of the present invention aim at overcoming these drawbacks and at allowing the connection of the different successive portions of a cableway of plastic material to be effected simply and rapidly.

In conventional manner, it is often provided to close the open side of the portions by means of a cover which covers the side and clips with respect to the free edges of the flanges of the portions.

SUMMARY OF THE INVENTION

According to the invention, a cover is provided for a cableway having lateral edges engaging elastically beneath an upper face of the central longitudinal groove formed in spaced arms of portions of a cableway.

The bottom of each arm of the portions is provided with a longitudinal protuberance having a free edge which lies in the plane of the lower bottom wall of these portions.

When it is desired to improve assembly of the cover and the portions, elastic stirrup elements are used, having branches which hook above the cover and on the protuberances of the bottom wall of the portion.

BRIEF DESCRIPTION OF THE DRAWINGS

The invention will be more readily understood on reading the following description with reference to the accompanying drawings, in which:

FIG. 7 is a transverse section of the combination illustrated in FIG. 6 and along the plane VII—VII passing through the joint of two successive portions of cableway.

DETAILED DESCRIPTION OF THE DRAWINGS

Figure 1:
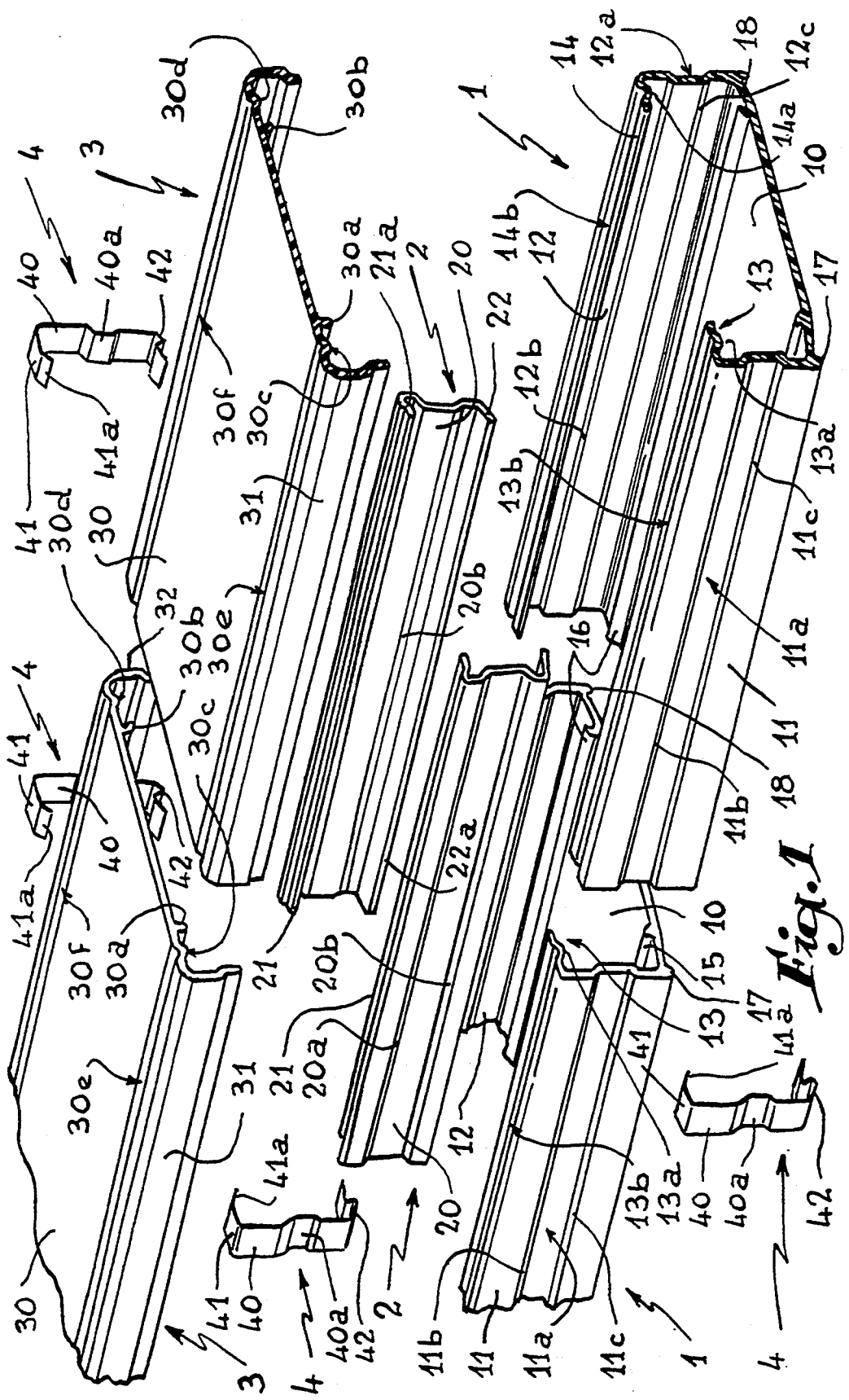
FIG. 1 is an exploded view in perspective of the different elements constituting a combination according to the invention.

Referring now to the drawings, FIG. 1 shows two portions 1 of cableway intended to be placed end to end and joined by two identical fish plates 2 placed opposite on either side of the butt-jointed ends of the two portions 1.

Each portion 1 is made by extrusion of an appropriate plastics material and roughly has a U-shaped cross-section.

Thus, each portion 1 comprises a central web 10 and two arms 11 and 12 whose free ends includes a flange 13, 14 parallel to the web 10 and oriented inwardly towards each other.

It will be observed that the web 10 is provided with two longitudinal beads 15, 16 parallel to the base of each arm 11, 12. Each bead includes a step 15a, 16a oriented in the direction of the corresponding arm 11, 12 respectively.

It will be observed that that part of the web included between the beads 15, 16 and the corresponding arms is oblique, i.e. it ascends towards the corresponding arm.

Each arm 11, 12 includes a longitudinal central groove 11a, 12a whose bottom is offset towards the inside with respect to the general plane of the arm in question, in order to form two oblique faces 11b, 11c–12b, 12c.

The flange 13, 14 of each arm is provided with an inner longitudinal rib 13a, 14a which forms on the top of the flanges a hollow 13b, 14b.

Each fish plate, which thus has the general form of a U, has a width equal to the inner height of the arms 11, 12 of each portion 1. The central web portions 20 of the fish plate is offset inwardly so that its outer wall forms two oblique faces facing each other and referenced 20a and 20b. The distance between these outer oblique faces is identical to that which separates the inner faces 11b, 11c and 12b and 12c of the arms. The first arm member 21 of each fish plate 2 is bent inwardly so that it forms, with the base of this arm, member a shoulder 21a. The height of the second arm member 22 of each fish plate is equal to the distance separating each step 15a, 16a from the base of the corresponding arm of the portions.

Figure 2:
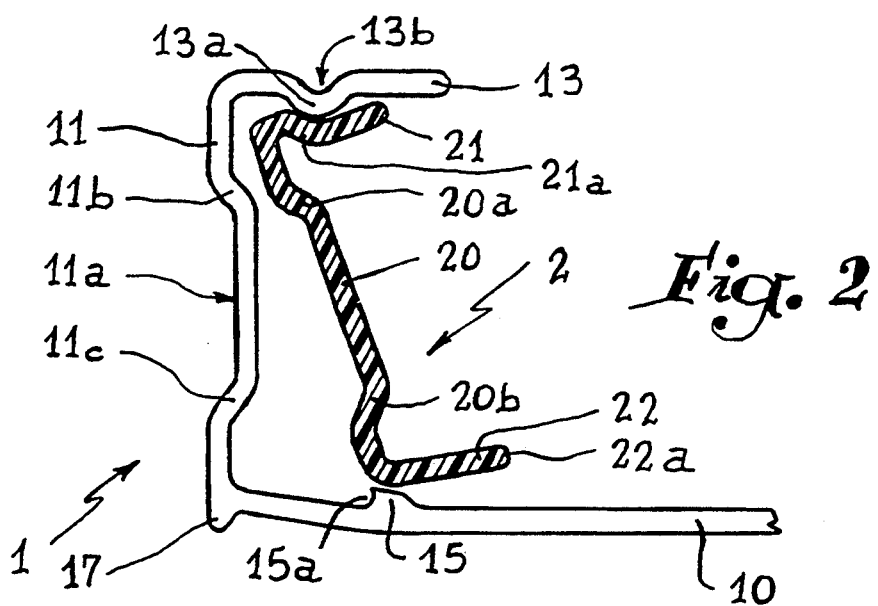
FIGS. 2 to 4 are transverse sections along a plane passing through the joint of two successive portions of cableway and illustrating the positioning of a fish plate connecting these two portions.
Figure 3:
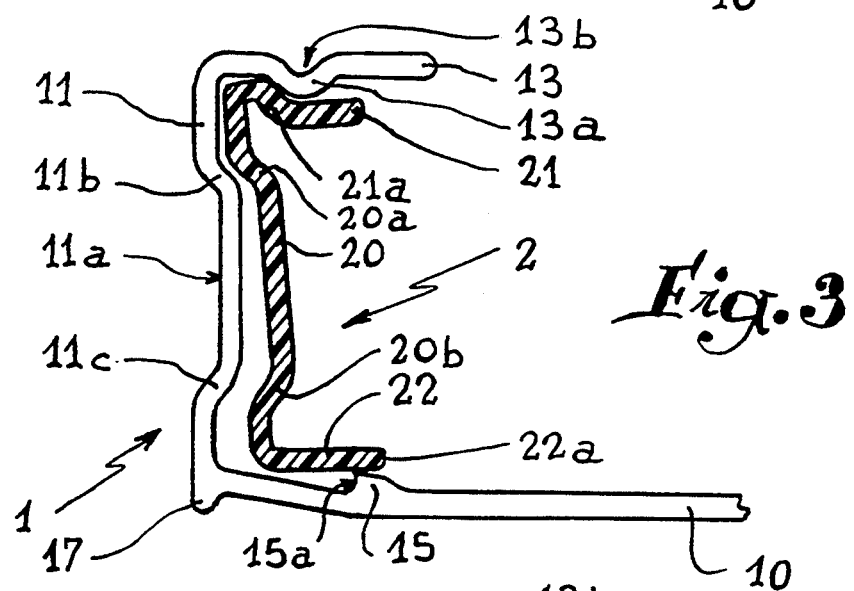
Figure 4:
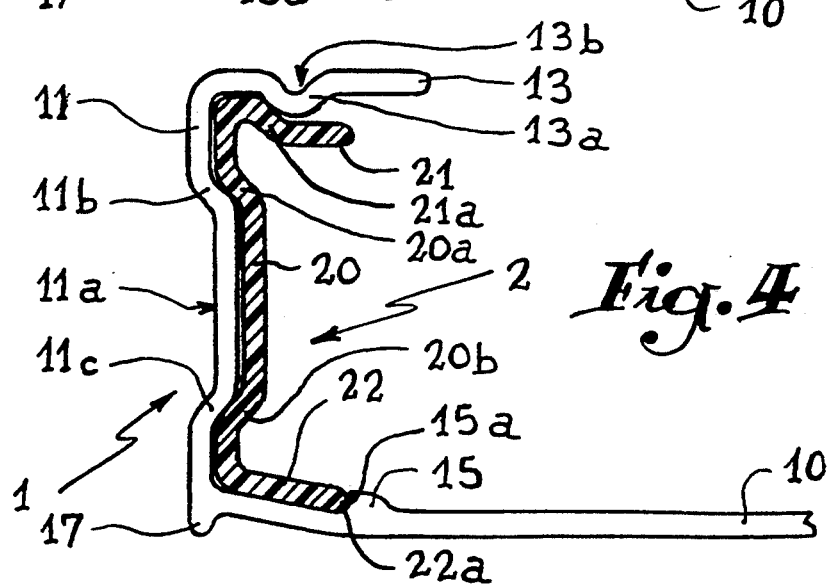

Each fish plate is placed in position, as illustrated in FIG. 2, by obliquely engaging the fish plate so that the shoulder 21a comes into contact with the corresponding rib 13a or 14a of the flanges 13 or 14 of the arms of the two portions placed end to end. Thereafter, by pivoting the fish plate about the rib in question, its bottom is brought into abutment against the corresponding arms of the profile, so that the oblique faces 20a, 20b of the fish plate cooperate with the two faces 11b, 11c–12b, 12c (FIG. 4). The last operation consists in slightly deforming the second arm member 22 of the fish plate so that its free edge 22a clips bequeath the corresponding step 15a, 16a (FIG. 4) in order that the fish plate is locked in position to rigidly connect two portions 1 placed end to end.

Figure 5:
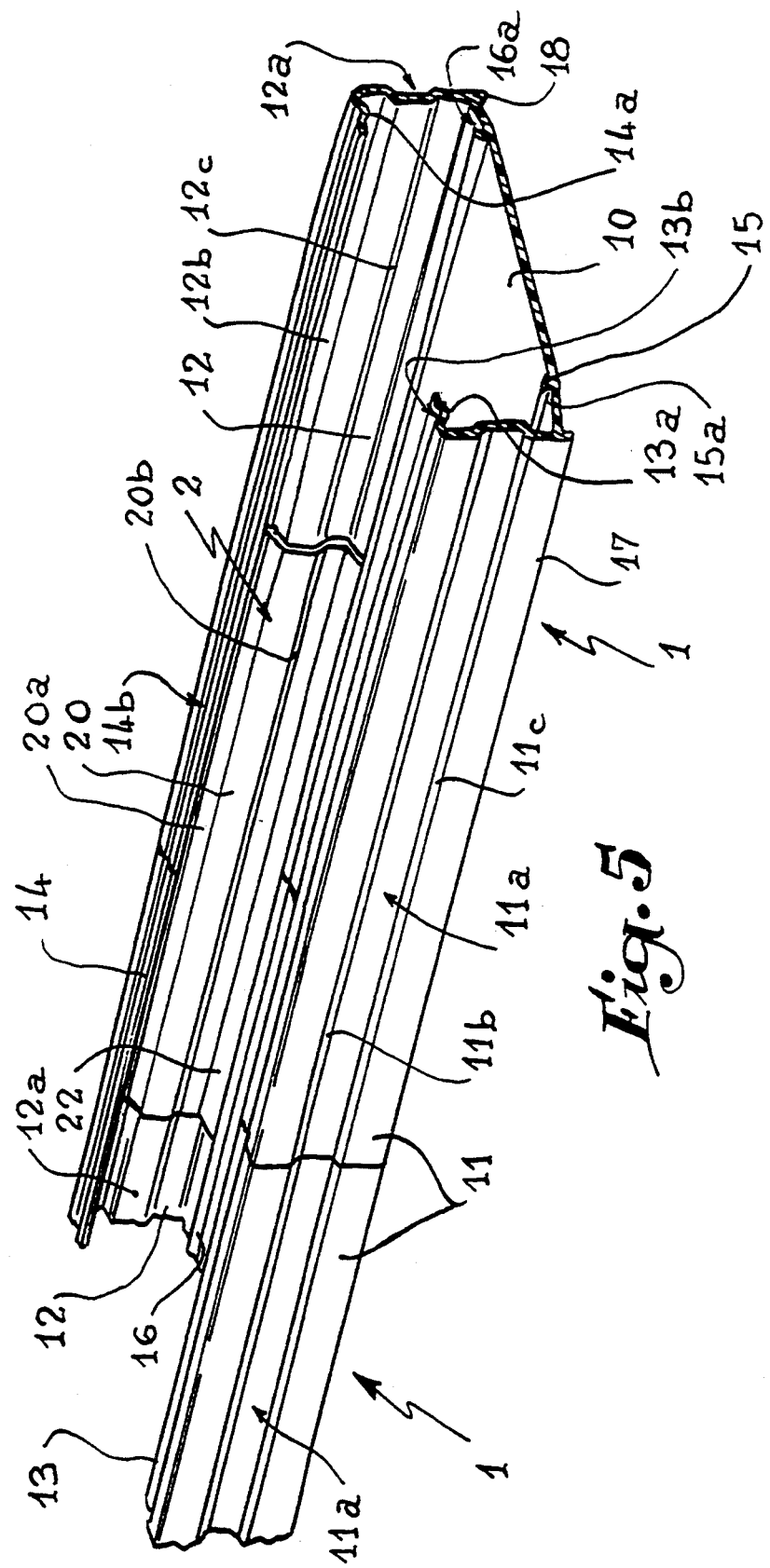
FIG. 5 is a view in perspective showing the assembly of two successive portions and of the fish plates which connect them.

When this connection has been effected, the two portions in question are assembled as illustrated in FIG. 5.

Figure 6:
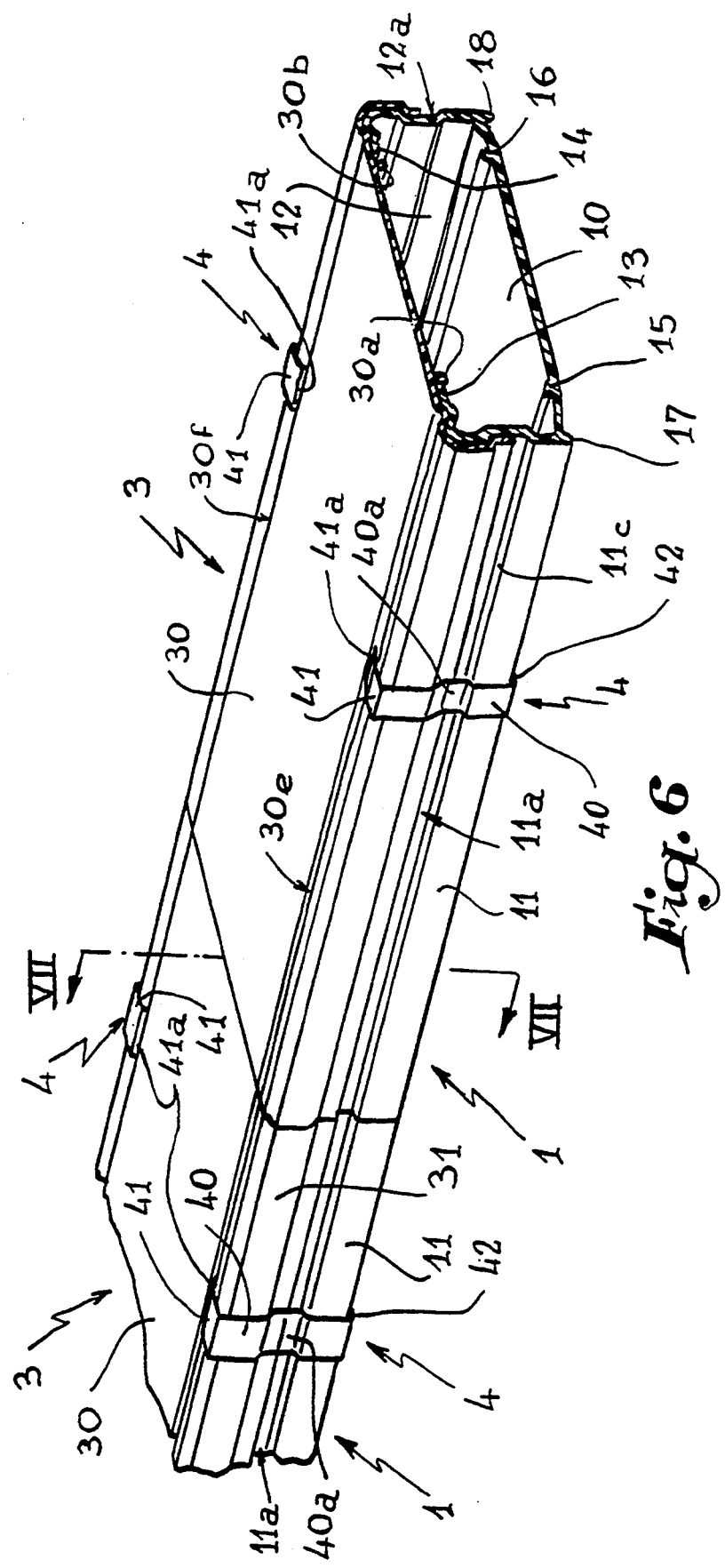
FIG. 6 is a view similar to that of FIG. 5, but showing the portions of cableway with covers and stirrup elements for supporting the covers.

FIGS. 6 and 7 show the manner in which a cover may be associated with the successive portions 1. This cover, referenced 3, includes a central portion or bottom 30 whose inner face has two longitudinal beads 30a, 30b which clip, in conventional manner, with respect to the free edges of the flange 13, 14 of the portions 1. It will be observed that the central portion 30 is further provided with two longitudinal projections made on its inner face and referenced 30c, 30d which are housed in the hollows 13b, 14b in the flanges. It will be noted that these projections defined thereabove two grooves 30e, 30f whose purpose will be explained more clearly hereinafter.

The cover 3 further has two lateral edges 31, 32 which are provided to be offset inwardly so as to clip with respect to the longitudinal central groove 11a, 12a of the arms of the portion 1. The cover 3 being made of a rigid plastic material, it is maintained perfectly with respect to the portion 1.

If, however, additional security is desired, elastic stirrup elements 4 may be used, naming a central web 40 offset inwardly at 40a and two end branches 41, 42. Branch 41 has a spaced hook portion 41a capable of engaging in the groove 30e, 30f of the cover, while its lower branch 42 is curved to form an lower hook portion in order to elastically overlap a longitudinal protuberance 17, 18 made at the bottom of each arm and whose free edge lies in the plane of the web 10.

It must, moreover, be understood that the foregoing description has been given only by way of example and that it in no way limits the domain of the invention which would not be exceeded by replacing the details of execution described by any other equivalents.

What is claimed is:

1. A cableway comprising, a plurality of generally u-shaped portions having ends and spaced arms extending from a central web, each of said arms having a flange oriented toward one another and generally parallel with respect to said central web, each of said flange having upper and lower surfaces, each of said central webs including first and second beads which extend generally parallel to said arms, said first bead including a step oriented toward one of said arms and said second bead including a step oriented toward the other of said arms, each of said arms including exterior and interior surfaces, a longitudinal central groove in each of said exterior surfaces of said arms thereby defining two spaced and inclined faces on the interior surface thereof, each of said upper flanges of said arms including a longitudinal rib oriented toward said central web, and means for assembling said portions in assembled end to end relationship, said means for assembling including at least one fish plate having a central web portion of a configuration to be cooperatively seated against said interior surface of one of said arms, said at least one fish plate including a pair of spaced arm members extending outwardly from said central web portion thereof, one of said arm members extending from said central web portion and into abutment with said step of one of said first and second beads when said central web portion of said at least one fish plate is engaged with said interior surface of said one of said arms, the other of said arm members of said at least one fish plate including a shoulder portion for engaging against one of said longitudinal ribs in said flange of said arms, whereby said at least one fish plate frictionally locks adjacent portions of the cableway in assembled relationship with respect to one another.

2. The cableway of claim 1 including a pair of fish plates in opposing relationship with respect to one another.

3. The cableway of claim 1 in which each of said webs includes inclined surface portions which extend from said steps to said arms, said arm members of said at least one fish plate extending along one of said inclined surface portions.

4. The cableway of claim 1 including a cover for extending across an opening defined in each portion between said spaced arms, said cover including a central portion and a pair of elongated spaced lateral edges, said lateral edges being engageable within said longitudinal grooves formed in said outer surface of said arms.

5. The cableway of claim 4 in which said cover includes two longitudinal projections extending generally parallel with said lateral edges and formed in said central portion of said cover, said longitudinal ribs in said flanges of said portions defining longitudinal recesses in said upper surfaces thereof, said longitudinal projections of said cover being receivable in said longitudinal recesses in said upper surface of said flanges of said arms when said cover is engageable over said portions of said cableway.

6. The cableway of claim 5 in which each of said arms of said portions includes a lower elongated protuberance having a lower edge.

7. The cableway of claim 6 in which each of said longitudinal projections in said cover defines a pair of elongated recesses along an upper surface of said cover, at least one elastic stirrup for retaining said cover to said portions of said cableway, said elastic stirrup including a lower hook portion for engaging said protuberance defined along each of said arms and a spaced hook portion for engaging in said longitudinal recesses in said upper surface of said cover.

8. The cableway of claim 7 in which each of said elastic stirrups includes a central recessed portion which cooperatively engages within said longitudinal groove in said outer surface of one of said arms.

9. The cableway of claim 8 including a pair of fish plate mounted in opposing relationship to each of said portions of said cableway.

10. The cableway of claim 1 in which each of said arms of said portions includes a lower elongated protuberance having a lower edge.

* * * * *